United States Patent
Honda

(10) Patent No.: US 6,928,184 B2
(45) Date of Patent: Aug. 9, 2005

(54) INSTRUMENT AND METHOD FOR METROLOGY

(75) Inventor: Kazuhiro Honda, Tokyo (JP)

(73) Assignee: Jeol Ltd., Tokyo (JP)

( * ) Notice: Subject to any disclaimer, the term of this patent is extended or adjusted under 35 U.S.C. 154(b) by 587 days.

(21) Appl. No.: 09/877,223

(22) Filed: Jun. 8, 2001

(65) Prior Publication Data

US 2002/0028012 A1 Mar. 7, 2002

(30) Foreign Application Priority Data

Jun. 16, 2000 (JP) ........................................ 2000-180851

(51) Int. Cl.[7] ............................. G06K 9/00; G06K 9/32; A61N 5/00; G21G 5/00
(52) U.S. Cl. ........................ 382/144; 382/145; 382/295; 250/492.2
(58) Field of Search ................................. 382/141–151, 382/795, 293–296, 284; 356/237.4, 237.5; 250/359, 492.2; 355/43, 46, 53, 54

(56) References Cited

U.S. PATENT DOCUMENTS

| | | | | |
|---|---|---|---|---|
| 4,676,630 A | * | 6/1987 | Matsushita et al. | 355/53 |
| 4,769,680 A | * | 9/1988 | Resor, III et al. | 355/43 |
| 5,132,195 A | * | 7/1992 | Pool | 430/22 |
| 5,437,946 A | * | 8/1995 | McCoy | 430/5 |
| 5,696,835 A | * | 12/1997 | Hennessey et al. | 382/141 |
| 6,136,517 A | * | 10/2000 | Fletcher | 430/394 |
| 6,225,013 B1 | * | 5/2001 | Cohen et al. | 430/30 |
| 6,583,854 B1 | * | 6/2003 | Hazama et al. | 355/53 |
| 6,723,973 B2 | * | 4/2004 | Saito | 250/492.22 |

OTHER PUBLICATIONS

"Evaluation of an Advanced Mask Writing System", Shinji Kubo et al., *Part of the SPIE Symposium on Photomask and X–Ray Mask Technology VI, Yokohama, Japan, Sep. 1999,* SPIE vol. 3748, pp. 426–435.
"Measuring Critical Dimensions and Overlays as Prescribed by the National Technology Roadmap for Semiconductors", Syed A. Rizvi, SPIE vol. 3236, pp. 170–175.
"Proximity Effect in Electron–Beam Lithography", T.H.P. Chang, *J. Vac. Sci. Technol.,* vol. 12, No. 6, Nov./Dec. 1975, pp. 1271–1275.

* cited by examiner

*Primary Examiner*—Amelia M. Au
*Assistant Examiner*—Wesley Tucker
(74) *Attorney, Agent, or Firm*—The Webb Law Firm

(57) ABSTRACT

A metrology instrument and method is offered which is capable of measuring the deviations between elements of an actual pattern at their joint without making any sample pattern for inspection in measuring and inspecting deviations produced at the joint portion when the pattern is drawn or transferred. The deviation $\Delta X$ parallel to the joint portion is found from an image obtained for inspection. On the other hand, the dose distribution diagrams of both elements of the pattern on the opposite sides of the joint portion are calculated. These dose distribution diagrams are shifted by $\Delta X$ along the joint portion and by a desired amount $\Delta Y$ vertical to the joint portion. Then, the diagrams are superimposed together. The resulting image is compared with the image for the inspection and the correlation between them is found. The value of $\Delta Y$ which minimizes the correlation (i.e., maximizes the degree of similarity) is found.

8 Claims, 6 Drawing Sheets

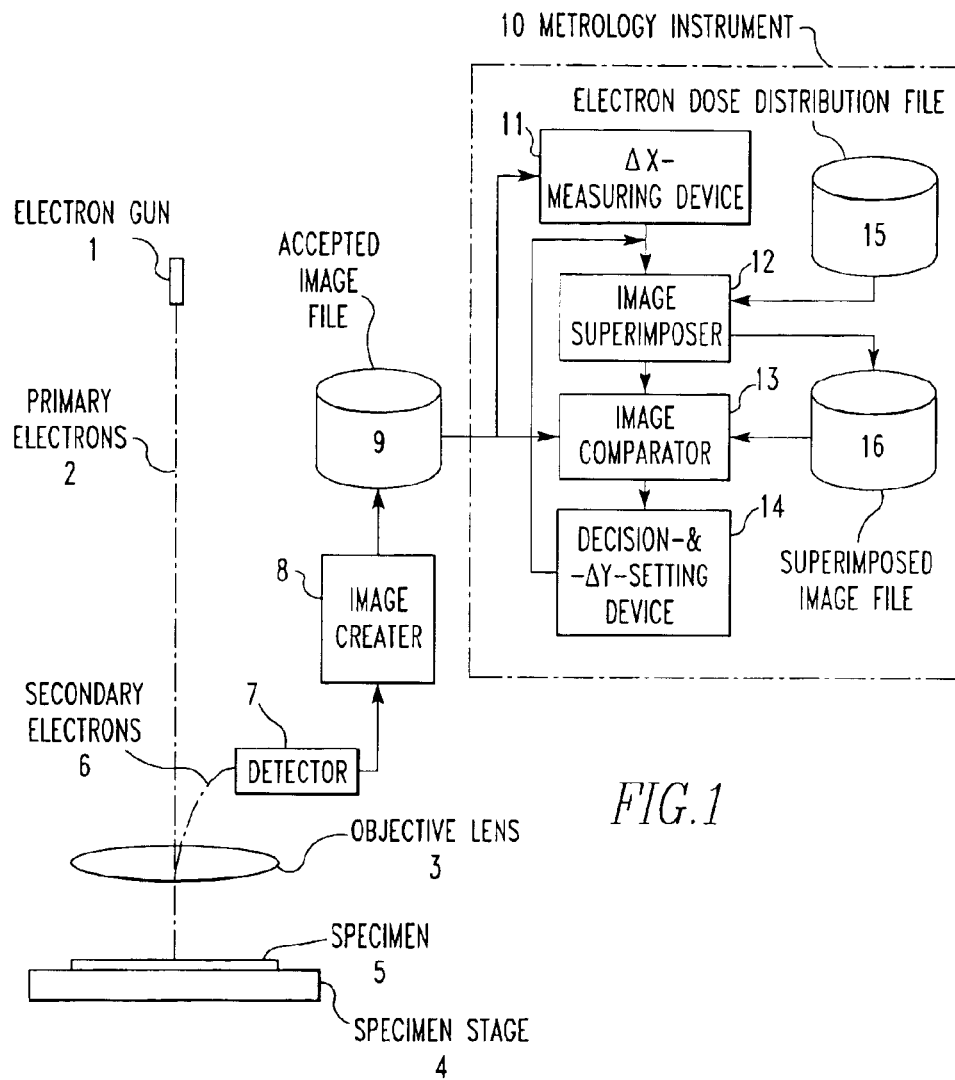
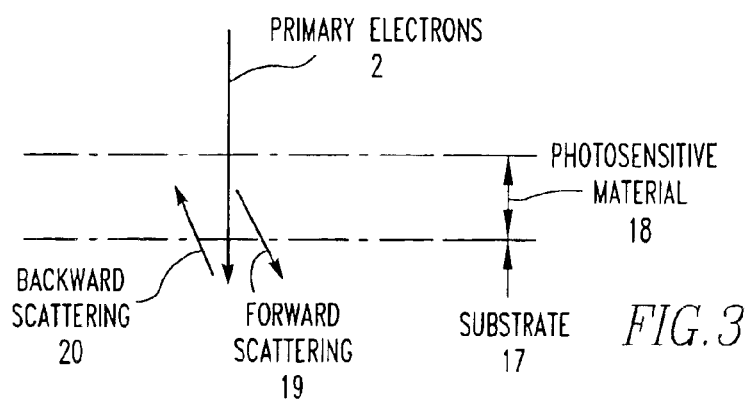
FIG.1
FIG.3

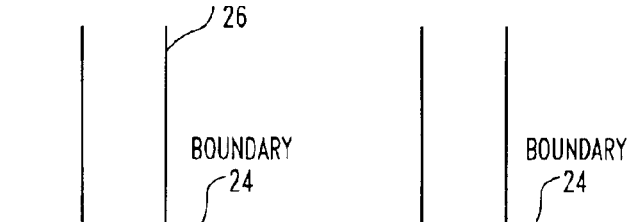
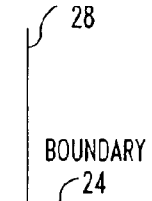
FIG.2(a)
FIG.2(b)
FIG.2(c)
FIG.2(d)
FIG.2(e)

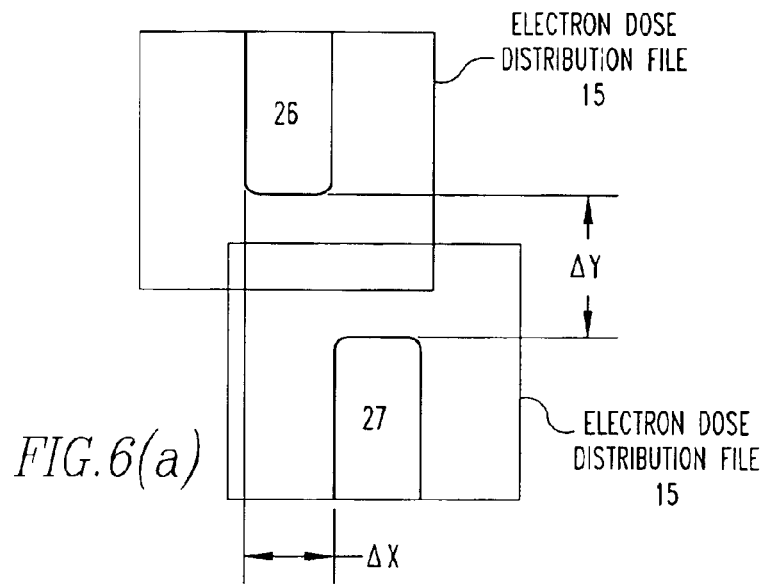
FIG.6(a)
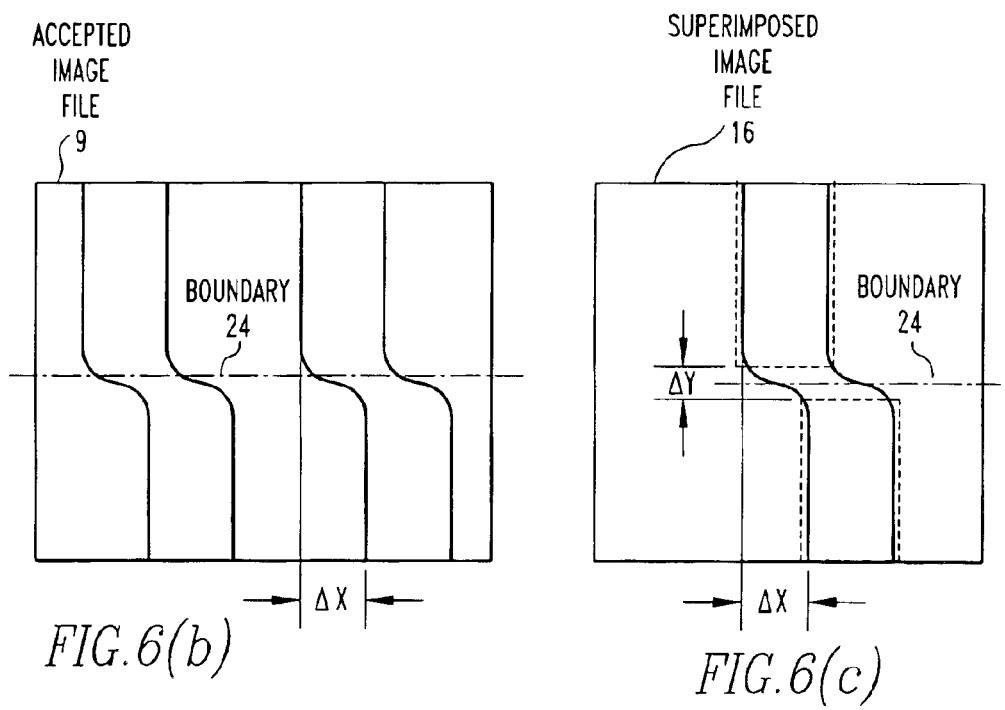
FIG.6(b)
FIG.6(c)

INSTRUMENT AND METHOD FOR METROLOGY

BACKGROUND OF THE INVENTION

1. Field of the Invention

The present invention relates to a metrology instrument and metrology method for inspecting whether elements of a pattern are stitched correctly at their joint within an image and, if there is a deviation between them, for measuring the amount of the deviation.

2. Description of the Related Art

Electron beam lithography methods include the block exposure method (also known as the cell projection method) using a mask having various kinds of apertures for improving the throughput. In particular, one of the apertures is selected, and an electron beam is partially illuminated onto a target through the aperture to transfer a desired pattern. In this method, pattern sections formed by the partial illumination are successively stitched together, thus forming the whole pattern. Therefore, the stitching accuracy for the pattern must be high. It is necessary to measure the amount of deviation at each stitching boundary.

Examples of shapes of stitched portions of patterns are shown in FIGS. 2(a)–2(e). FIG. 2(a) shows the upper half 26 of a pattern to be stitched. FIG. 2(b) shows the lower half 27 of the pattern. FIG. 2(c) shows the manner in which the upper half 26 and the lower half 27 of the pattern have been normally stitched to form a straight pattern (transferred pattern) 28. FIG. 2(d) shows the manner in which the upper and lower straight portions of a pattern are not correctly stitched at a joint or a boundary 24 but form a distorted transferred pattern 28. FIG. 2(e) shows the manner in which the upper portion 26 and the lower portion 27 of a pattern are stitched at a joint with deviations $\Delta X$ and $\Delta Y$ in the X- and Y-directions, respectively, to indicate their relations to the transferred pattern 28. This transferred pattern 28 shows a pattern actually formed on a wafer. On the other hand, the upper portion 26 and the lower portion 27 of the pattern can be considered to show elements of a prototypic pattern to be formed. Accordingly, in FIG. 2(e), the actually formed transferred pattern 28 is indicated by solid lines, while the upper portion 26 and the lower portion 27 of the pattern which indicate the elements of the prototypic pattern are indicated by broken lines. A straight boundary line 24 running along the joint or the stitching part is also shown.

The edges of the formed pattern become blunted because of scattering of electrons within the photosensitive material. This phenomenon is known as the proximity effect, which is illustrated diagrammatically in FIG. 3. Primary electrons 2 emitted from an electron gun (not shown) are made to hit a photosensitive material 18 on a substrate 17. The primary electrons 1 penetrate into the photosensitive material 18 according to the energies that the electrons possess, go through the layer of this photosensitive material 18, and even reach the substrate 17. In electron-beam lithography equipment, an accelerating voltage of 50 keV is normally used. During this process, the photosensitive material 18 is subjected to multipath exposure by elastic scatterings of electrons including forward scattering 19 caused in the photosensitive material 18 and backward scattering 20 caused on the substrate 17. As a result, the edges of the formed pattern become blunted (less sharp).

In measuring the stitching accuracy at the joint of such elements of a pattern, the following problem takes place. As shown in FIG. 2(e), the amount of horizontal deviation $\Delta X$ (i.e., deviation normal to the pattern shape) can be accurately calculated if the edges of the pattern are detected at the upper portion 26 and the lower portion 27 that are stitched. On the other hand, the amount of vertical deviation $\Delta Y$ (i.e., deviation parallel to the pattern shape) cannot be easily measured because the edges of the transferred pattern 28 are blunted by the aforementioned proximity effect.

In measuring the stitching accuracy at such a pattern joint by one conventional technique, verniers 21 and 22 extending in the X- and Y-directions, respectively, are transferred inside and outside a rectangular pattern as shown in FIG. 4. As shown in FIG. 5, the stitching deviation (or error) $\Delta X$ at the joint 24 of the patterns 23a and 23b is calculated from the results of detection of the edges of the two patterns 23a and 23b using line profiles 25a and 25b that are derived from scanning waveforms by detecting secondary electrons.

Another conventional method uses two transferred box-shaped patterns, i.e., an outer box-shaped pattern 29 and an inner box-shaped pattern 30, of different sizes as shown in FIG. 7(a). The relative positional relations (x1, x2, y1, y2) between the transferred outer box-shaped pattern 29 and inner box-shaped pattern 30 are measured, as shown in FIG. 7(b). Then, the stitching accuracy is calculated. This is known as the box-in-box method.

With any of the two conventional methods described above, however, it is necessary to previously make a sample pattern used for measurement of the deviation at the joint. An exorbitantly long time is taken to readjust the electron-beam lithography equipment for eliminating the stitching error. Consequently, it is impossible to measure the stitching error by the use of an actual logic pattern.

SUMMARY OF THE INVENTION

It is an object of the present invention to provide a metrology instrument which solves the foregoing problems with the prior art techniques, does not need to make any sample pattern for measurement of a stitching deviation, or a stitching error, is capable of measuring the stitching error with an actual logic pattern, and provides stable metrology reproducibility.

A metrology instrument that achieves this object in accordance with the teachings of the invention comprises: a means for obtaining an image pattern for inspection, the image pattern having a stitching part at which a pair of elements of the image pattern is stitched each other along a straight boundary line extending along the stitching part; a $\Delta X$-measuring device for measuring deviation $\Delta X$ between stitched elements of the image pattern along the straight boundary line; a storing means for storing two sets of data about images indicating dose distributions in memory, the dose distributions being calculated by a simulation method under the condition that an energetic beam used when the elements of the pattern are transferred should be applied; an image superimposing means for shifting one of the images indicating the dose distributions by the $\Delta X$ along the straight boundary line and by a desired amount $\Delta Y$ in a direction vertical to the straight boundary line relatively to the other and superimposing both of the images indicating the dose distributions; and an image comparator for taking the correlation between image data obtained for the inspection and image data produced by the superimposing by comparing these two kinds of image data.

The above-described object is also achieved in accordance with the teachings of the invention by a metrology method comprising the steps of: obtaining an image pattern for inspection, said image pattern having a stitching part at which a pair of elements of the image pattern is stitched each other along a straight boundary line extending along the stitching part; measuring deviation ΔX between stitched elements of the image pattern along the straight boundary line; storing two sets of data about images indicating dose distributions in memory, the dose distributions being calculated by a simulation method under condition that an energetic beam used when the elements of the pattern are transferred should be applied; shifting one of the images indicating the dose distributions by the ΔX along a straight boundary line and by a desired amount ΔY in a direction vertical to the straight boundary line relatively to the other and superimposing both of the dose distributions images; and taking the correlation between image data obtained for said inspection and image data produced by the superimposing by comparing these two kinds of image data.

Other objects and features of the invention will appear in the course of the description thereof, which follows.

BRIEF DESCRIPTION OF THE DRAWINGS

FIG. 1 is a diagram illustrating the structure of a metrology instrument in accordance with the present invention;

FIGS. 2(a)–2(e) are diagrams illustrating the state of the joint of stitched elements of a pattern when a lithographic or pattern transfer process is performed;

FIG. 3 is a diagram illustrating the proximity effect;

FIGS. 6(a)–6(c) are a diagram illustrating the operation of a metrology instrument in accordance with the present invention;

DESCRIPTION OF THE PREFERRED EMBODIMENTS

Figure 4:
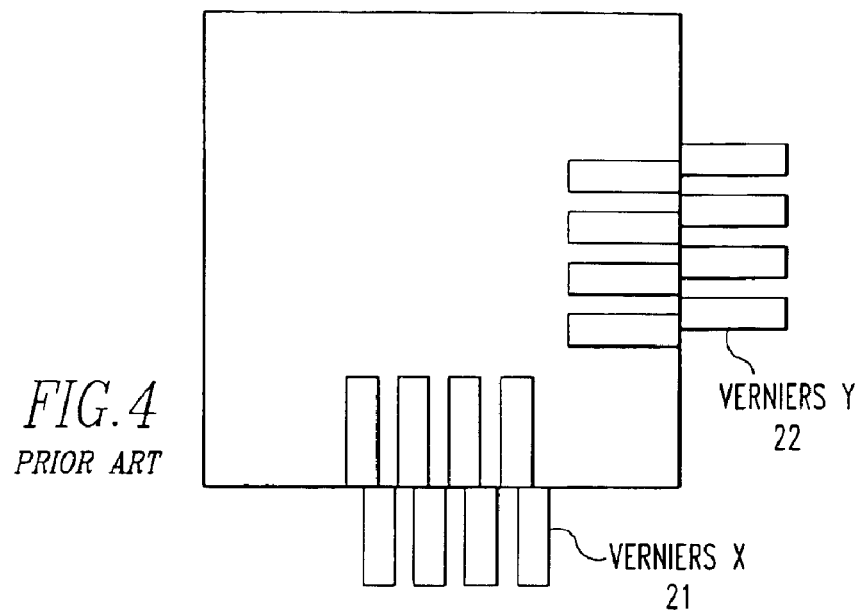
FIG. 4 is a diagram illustrating one conventional method.
Figure 5:
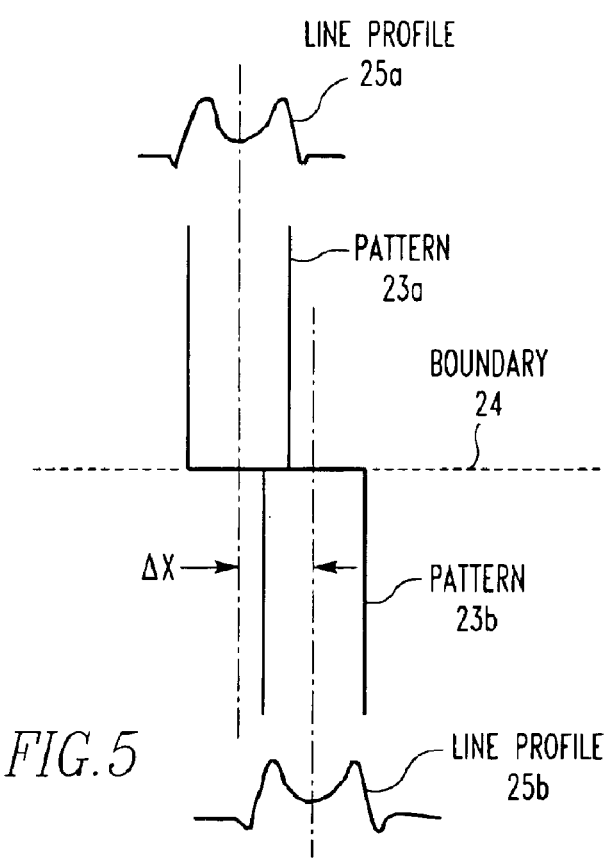
FIG. 5 is a diagram illustrating the operation of the conventional method illustrated in FIG. 4.

A scanning electron microscope (SEM) in accordance with the present invention is described in detail by referring to FIG. 1. This microscope has an electron gun 1 emitting primary electrons 2 which are passed through various electron lenses (not shown) and focused onto a specimen 5 by an objective lens 3. This specimen 5 is held on a specimen stage 4. The focused primary electron beam is scanned in the X- and Y-directions by an XY scanner (not shown). Secondary electrons 6 released from the specimen 5 are detected by a detector 7. An image is created from the output signal from the detector 7 by an image accumulation means, signal amplification means, or the like in an image creator 8. The created image is stored in an accepted image file 9.

A metrology instrument built in accordance with the present invention is generally indicated by reference numeral 10 and comprises a ΔX-measuring device 11, an electron dose distribution file 15, an image superimposer 12, a superimposed image file 16, an image comparator 13, and a decision-and-ΔY-setting device 14. The ΔX-measuring device 11 measures the deviation ΔX between two elements of a pattern at their joint or boundary (such as a boundary 24 shown in FIG. 2(e)) along a straight line extending across the stitching part, the two elements being indicated by image data stored in the accepted image file 9. For example, these two elements are the upper portion 26 (FIG. 2(a)) and the lower portion 27 (FIG. 2(b)), respectively, of a pattern to be stitched. The distributions of electron doses impinging on the specimen which are determined by shapes corresponding to these two pattern elements have been previously calculated for these pattern elements and stored in the electron dose distribution file 15. The image superimposer 12 shifts one of the two electron dose distribution diagrams relatively to the other by given amounts (i.e., the aforementioned ΔX and ΔY (described later)) and superimposes them together. The image produced by the image superimposer 12 is stored in the superimposed image file 16. The image comparator 13 compares the image data in the superimposed image file 16 with the image data in the accepted image file 9. The decision-and-ΔY-setting device 14 calculates the degree of similarity from the results of the comparison made by the image comparator 13, i.e., the results of the comparison between the image data in the superimposed image file 16 and the image data in the accepted image file 9. The decision-and-ΔY-setting device 14 adjusts and sets the amount of deviation ΔY in a direction vertical to the straight line across the joint (e.g., the joint 24 shown in FIG. 2(e)) until this degree of similarity approaches a desired evaluation value.

Figure 8:
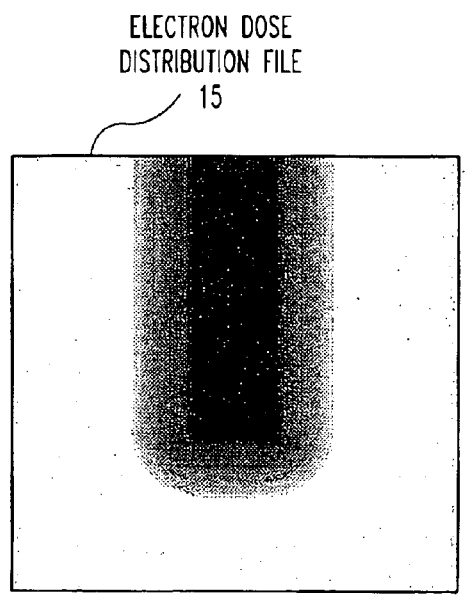
FIG. 8 is a diagram illustrating one example of image within an electron dose distribution file in accordance with the present invention.

The operation of this metrology instrument 10 constructed in this way is described in detail by referring to FIGS. 6(a)–6(c). FIG. 6(a) is a diagram illustrating the manner in which the upper portion 26 and the lower portion 27 of the pattern to be stitched are shifted by ΔX and ΔY. Image data of upper and lower portions are stored in the electron dose distribution file 15. For facilitating the understanding, the image of the upper portion 26 is shown in an almost actual form in FIG. 8, which is stored in the electron dose distribution file 15. FIG. 6(b) shows one example of image data in the accepted image file 9. In this example, a pattern consisting of upper and lower elements to be stitched is extending straight in the Y-direction. However, during the process of lithography or transferring, a deviation has occurred at the joint in both X- and Y-directions. As a result, the transferred pattern gets out of straight, producing a deformation at the joint 24. FIG. 6(c) shows an image obtained by superimposing together the images shown in FIG. 6(a). Image data of this superimposed image is stored in the superimposed image file 16.

The ΔX-measuring device 11 detects the edges of the upper and lower portions of the pattern shown in FIG. 6(b), which is stored in the accepted image file 9, and measures the deviation ΔX in the X-direction. On the other hand, calculated electron dose distributions of the upper portion 26 and the lower portion 27 of the pattern as shown in FIG. 6(a) are stored in the electron dose distribution file 15.

The image superimposer 12 takes the calculated electron dose distributions of the upper and lower portions of the pattern out of the electron dose distribution file 15. The pattern has the same width with that of the image stored in the accepted image file 9. Assuming that the positional relations between the upper and lower portions in the X- and Y-directions are given by deviations ΔX and ΔY, respectively, the two images are superimposed together, as shown in FIG. 6(c). The resulting image is stored in the superimposed image file 16. At this time, the deviation ΔX is indicated by the output from the ΔX-measuring device. In the initial calculation, the deviation ΔY is an arbitrary value. This deviation ΔY is updated according to the output ΔY from the decision-and-ΔY-setting device 14 as described later.

The electron dose distributions stored in the dose distribution file 15 can be calculated based on a well-known calculational means (e.g., "Proximity effect in electron-beam lithography", J. Vac. Sci. Technol., Vol. 12, No. 6, 1975) as given by Eq. (1).

$$I(x_0, y_0) = \int_x \int_y G(x, y) \cdot W(x_0 - x, y_0 - y) dx dy \quad (1)$$

where $x_0$ and $y_0$ are the coordinates of a point at which the electron dose should be found, x and y are the coordinates of a point hit by an electron beam, I is the electron dose, G is a transfer function, and W is a density distribution function. The shape of the pattern is indicated by the transfer function G. The amount of the electron dose at a position that is at a distance from the beam-hit position is given by the density function W. Since Eq. (1) above for calculation of electron dose distributions involves double integration, which needs a long computational time. Therefore, it is impossible to perform the present calculation in real time, for controlling the process. In the metrology instrument 10 in accordance with the present invention, however, the electron dose distributions are calculated in off time. Only the output indicating the results is stored in the electron dose distribution file 15. It is not necessary to perform the calculation in real time.

FIG. 6(c) shows one example of image data stored in the superimposed image file 16. In this figure, the solid lines indicate the results of passage of the electron dose distribution through a filter simulating the developing characteristics of a photosensitive material. The output from the filter is assumed to be zero if the electron dose is under a given threshold value $I_0$. Accordingly, the solid lines of FIG. 6(c) indicate a pattern that will be formed in practice.

The image comparator 13 takes the correlation Er between the image data in the accepted image file 9 and the image data in the superimposed image file 16. The correlation Er is represented by the sum of the squares of differences as given by Eq. (2) below.

$$Er = \Sigma_{x,y}(Iin(x, y) - Is(x, y))^2 \quad (2)$$

where x, y indicate coordinates and are discretized to take the sum, Iin indicates the amount of luminance of the aforementioned accepted image file, and Is indicates the amount of luminance of the superimposed image file.

The decision-and-ΔY-setting device 14 makes a decision as to whether the correlation Er is less than a certain value ω. If the result of the decision is NO, the device 14 updates the deviation ΔY and reinputs the deviation value into the image superimposer 12. Using the updated deviation ΔY, the image superimposer 12 superimposes together the electron dose distribution diagrams corresponding to the upper portion 26 and the lower portion 27, respectively, of the pattern and stores the result in the superimposed image file 16. This sequence of operations is repeated until the correlation Er becomes lower than the certain value ω. If the correlation Er is lower than the certain value ω, updating of the deviation ΔY is ended. The amounts of deviations ΔX and ΔY at the junction are output.

The deviation ΔY is updated, for example, as given by $$\Delta Y = \alpha \cdot \sqrt{Er} + \Delta Yp \quad (3)$$

where α is a coefficient and ΔYp is the value of the deviation ΔY assumed before the updating.

In the method described above, the process is repeated while updating the deviation ΔY until the correlation Er becomes lower than the certain value ω, to determine the deviation ΔY. Alternatively, the correlation Er may be found from plural values of ΔY within a given range, and the deviation ΔY that minimizes the value of the correlation Er may be found.

Furthermore, in the method described above, an image obtained by superimposing together the upper portion 26 and the lower portion 27 of the pattern is stored in the superimposed image file 16. This storing operation is not always necessary.

In addition, for the sake of illustration, the upper portion 26 of the pattern, lower portion 27, X-direction, Y-direction, ΔX, ΔY, etc. are defined in relation to the vertically straight pattern as shown in FIG. 2. Similarly, the left portion 26 of the pattern, the right portion 27, etc. may be defined in relation to a horizontally straight pattern. To avoid complicating the explanation, however, the vertically extending pattern represents various patterns.

The above-described sequence of operations can be summarized into the following steps (1)–(6):

(1) The electron dose distribution diagrams of the upper portion 26 and the lower portion 27, respectively, of the pattern are calculated and stored in the electron dose distribution file 15.

(2) An SEM image for inspection is obtained.

(3) The deviation ΔX between the portions of the pattern parallel to the joint portion 24 is measured from the SEM image for inspection.

(4) One of the electron dose distribution diagrams of the upper portion 26 and the lower portion 27 of the pattern is shifted by ΔX and a desired value ΔY, relatively to the other, and then the diagrams are superimposed together to form a superimposed image.

(5) The image for inspection and the superimposed image are compared, and the correlation Er between them is found.

(6) The value of the deviation ΔY which minimizes the correlation value Er (i.e., maximizes the degree of similarity) or which brings the correlation value Er to within the given value ω is found.

Figure 9:
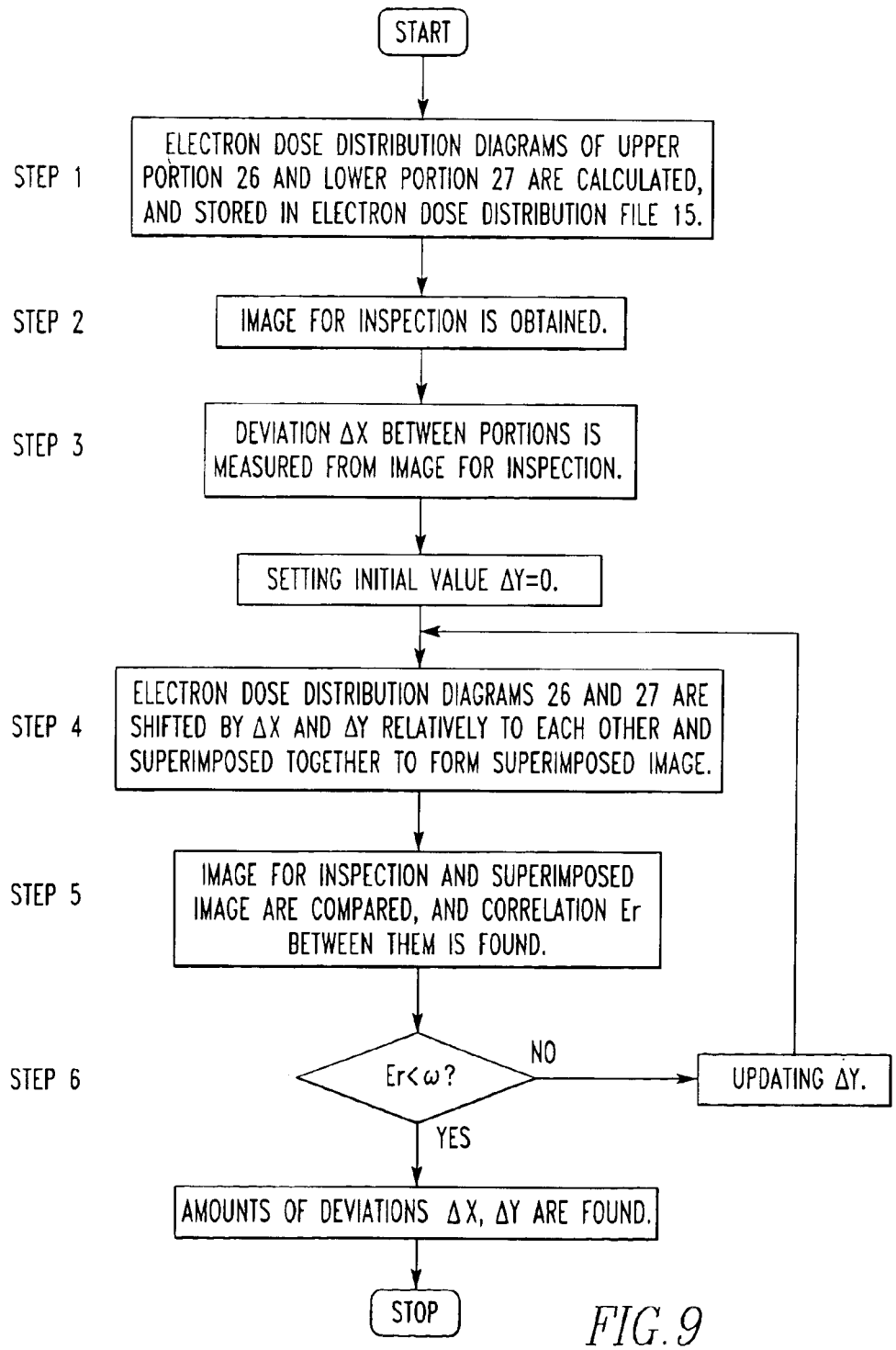
FIG. 9 is a flowchart illustrating one example of a metrology/inspection sequence in accordance with the present invention.

It is to be noted that the order in which these steps are carried out is not limited to the order described above. For example, steps (1) and (2) can be interchanged in order. One example of sequence of operations in which the initial value of the deviation ΔY is set to 0 and the deviation ΔY is found allowing the correlation value Er within the given value ω is illustrated in the flowchart of FIG. 9.

In the description provided thus far, the present invention is applied to a metrology instrument and method in which images obtained by a scanning electron microscope are used. The present invention is not restricted thereto. For example, the invention can be applied to all metrology instruments and methods using images obtained by the use of light or the like. Moreover, in the description given above, a method using an electron beam is used in drawing and transferring a pattern. Obviously, the invention can also be applied to other methods of finding the deviations between elements of a pattern using an energetic beam such as light and calculating the dose distributions of the used energetic beam over the elements.

As described thus far, the metrology instrument in accordance with the present invention comprises: a means for obtaining an image pattern for inspection, said image pattern having a stitching part at which a pair of elements of said image pattern is stitched each other along a straight boundary line including said stitching part; a ΔX-measuring device for measuring the deviation ΔX between stitched elements of the image pattern along the straight boundary line; a storing means for storing two sets of data about images indicating dose distributions in memory, the dose distributions being calculated by a simulation method under the condition that an energetic beam used when the elements of the pattern are transferred should be applied; an image superimposing means for shifting one of the images indicating the dose distribution by $\Delta X$ along said straight boundary line and by a desired amount $\Delta Y$ in a direction vertical to said straight boundary line relatively to the other and superimposing together the images; and an image comparator for taking the correlation between image data obtained for said inspection and image data produced by the superimposing by comparing these two kinds of image data.

The metrology method in accordance with the present invention comprises the steps of: obtaining an image pattern for inspection, said image pattern having a stitching part at which a pair of elements of said image pattern is stitched each other along a straight boundary line including said stitching part; measuring the deviation $\Delta X$ between stitched elements of the image pattern along the straight boundary line; storing two sets of data about images indicating dose distributions in memory, said dose distributions being calculated by a simulation method under the condition that an energetic beam used when the elements of the pattern are transferred should be applied; shifting one of the dose distribution images by the $\Delta X$ along the straight boundary line and by a desired amount $\Delta Y$ in a direction vertical to the straight boundary line relatively to the other and superimposing both of the dose distribution images; and taking the correlation between image data obtained for the inspection and image data produced by the superimposing by comparing these two kinds of image data.

As a result, the following advantages can be derived:

(a) The amounts of deviations $\Delta X$ and $\Delta Y$ can be measured from the shape of the deformed joint.

Figure 7A:
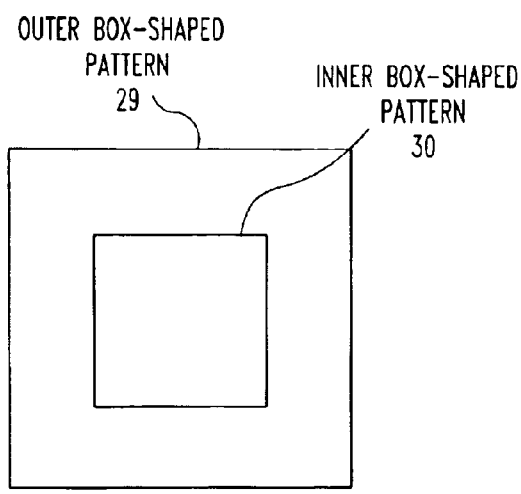
FIGS. 7(a) and 7(b) are a diagram illustrating another conventional method.
Figure 7B:
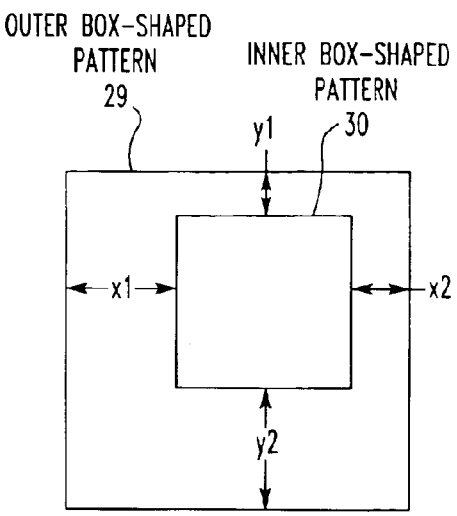

(b) It is not necessary to create a sample pattern for measurement as shown in FIG. 4 or 7, in order to measure the amounts of deviations at the joint.

(c) Since calculations of electron dose distributions which need a large time-consumption are carried out in off time, the present invention permits measurements to be performed in real time without time-consuming computations.

As used in the following claims, the terms "minimizes the correlations" means to "maximize the degree of similarity."

What is claimed is:

1. A metrology instrument for measuring and inspecting deviations between a pair of pattern elements to be stitched within an image formed by electron beam lithography, said metrology instrument comprising:

a means for obtaining an image of the stitched pattern for inspection, said image displaying a pair of elements of said image pattern having perpendicular edges extending in X and Y directions and being stitched to each other to align along a straight boundary line extending in the X direction;

a $\Delta X$-measuring device for measuring the deviation $\Delta X$ between stitched elements of said image pattern along said straight boundary line;

a storing means for storing in computer memory sets of data defining dose distribution images of each pattern element in said pair of pattern elements indicating the dose distributions, said dose distribution images being calculated by a simulation method under the condition that a selected energetic beam is used when said pattern elements are transferred;

an image superimposing means for shifting one of the dose distribution images measured by said $\Delta X$ along said straight boundary line and by a desired amount $\Delta Y$ in a direction perpendicular to said straight boundary line relatively to the other and superimposing both of said dose distribution images; and an image comparator for taking the correlation between image data obtained for said inspection and said superimposed dose distribution image data by comparing these two kinds of image data.

2. The metrology instrument of claim 1, wherein there are further provided a decision device for making a decision based on said correlation as to whether said $\Delta Y$ should be updated and a $\Delta Y$-setting device for resetting $\Delta Y$ if said $\Delta Y$ is updated, and wherein said $\Delta Y$ is updated until said correlation becomes less than a given value.

3. The metrology instrument of claim 1, further comprising a $\Delta Y$-setting device for updating the value of $\Delta Y$ a set number of times and a decision device for detecting the value of $\Delta Y$ that minimizes said correlation.

4. The metrology instrument of any one of claims 1 to 3, wherein image data about dose distributions of plural pattern shapes are stored in memory.

5. A metrology method for measuring and inspecting deviations between a pair of pattern elements formed by electron beam lithography to be stitched within an image, said method comprising the steps of:

obtaining an image of the stitched pattern for inspection, said image displaying a pair of elements of said image pattern having perpendicular edges extending in X and Y directions and being stitched to each other to align along a straight boundary line extending in the X direction;

measuring the deviation $\Delta X$ between stitched elements of said image pattern along said straight boundary line;

storing in computer memory sets of data about images of each pattern element in said pair of pattern elements indicating the dose distributions, said dose distributions being calculated by a simulation method under the condition that a selected energetic beam is used when said elements of said pattern are transferred;

shifting one of the dose distribution images by said measured $\Delta X$ along said straight boundary line and by a desired amount $\Delta Y$ in a direction perpendicular to said straight boundary line relatively to the other and superimposing both of the dose distribution images; and taking the correlation between image data obtained for said inspection and image data produced by the superimposing by comparing these two kinds of image data.

6. The metrology method of claim 5, further comprising the steps of:

making a decision based on said correlation as to whether said $\Delta Y$ should be updated;

resetting said $\Delta Y$ if updated; and updating said $\Delta Y$ until said correlation decreases below a certain value.

7. The metrology method of claim 5, further comprising the steps of:

updating said $\Delta Y$ a set number of times; and detecting the value of $\Delta Y$ which minimizes said correlation (i.e., maximizes the degree of similarity).

8. The metrology method of any one of claims 5 to 7, further comprising the step of storing image data about dose distributions corresponding to plural pattern shapes in memory.

* * * * *